United States Patent
Olson, III et al.

(10) Patent No.: US 9,458,523 B2
(45) Date of Patent: Oct. 4, 2016

(54) CORROSION RESISTANT GLASS COATING APPLIED TO CERAMIC FOAM USED TO FILTER MOLTEN ALUMINUM

(75) Inventors: Rudolph A. Olson, III, Hendersonville, NC (US); Matthew W. Willer, Hendersonville, NC (US); Leonard S. Aubrey, Hendersonville, NC (US)

(73) Assignee: Porvair Plc, Norfolk (GB)

( * ) Notice: Subject to any disclaimer, the term of this patent is extended or adjusted under 35 U.S.C. 154(b) by 0 days.

(21) Appl. No.: 13/391,669

(22) PCT Filed: Aug. 24, 2010

(86) PCT No.: PCT/US2010/046542
§ 371 (c)(1),
(2), (4) Date: Feb. 22, 2012

(87) PCT Pub. No.: WO2011/028549
PCT Pub. Date: Mar. 10, 2011

(65) Prior Publication Data
US 2012/0144958 A1      Jun. 14, 2012

Related U.S. Application Data

(60) Provisional application No. 61/236,340, filed on Aug. 24, 2009.

(51) Int. Cl.
C22B 9/02    (2006.01)
B01D 39/20   (2006.01)
C22B 21/06   (2006.01)

(52) U.S. Cl.
CPC ........... *C22B 9/023* (2013.01); *B01D 39/2093* (2013.01); *C22B 21/066* (2013.01); *B01D 2239/0478* (2013.01); *Y02P 10/234* (2015.11)

(58) Field of Classification Search
CPC .. C22B 9/023; C22B 21/066; B01D 39/2093
USPC ................. 75/407, 412; 428/307.7, 312.6
See application file for complete search history.

(56) References Cited

U.S. PATENT DOCUMENTS

| | | | |
|---|---|---|---|
| 2,997,402 A * | 8/1961 | McDonald et al. | 501/127 |
| 3,524,548 A | 8/1970 | McDonald et al. | |
| 4,719,013 A * | 1/1988 | Brockmeyer | B01D 39/2093 210/510.1 |
| 4,889,630 A * | 12/1989 | Reinhardt et al. | 210/490 |
| 5,045,111 A | 9/1991 | Sane et al. | |
| 5,520,823 A | 5/1996 | Jones et al. | |
| 5,874,000 A * | 2/1999 | Herding | 210/490 |
| 6,635,339 B1 | 10/2003 | Adler et al. | |
| 2003/0062303 A1 | 4/2003 | Hoffman et al. | |
| 2006/0284351 A1* | 12/2006 | Olson et al. | 264/628 |

FOREIGN PATENT DOCUMENTS

| | | |
|---|---|---|
| JP | 2000 297333 | 10/2000 |
| JP | 2000-297333 A | 10/2000 |
| WO | WO 2007120483 A2 | 10/2007 |

OTHER PUBLICATIONS

European Application No. 10814261.3, Supplemental European Search Report, dated Nov. 14, 2012.

* cited by examiner

*Primary Examiner* — Alexander Polyansky
(74) *Attorney, Agent, or Firm* — Joseph T. Guy; Perkins Law Firm, LLC

(57) ABSTRACT

An improved filter is described which is particularly suitable for filtering molten metal. The filter has a porous open celled ceramic foam body with voids separated by struts wherein a portion of the struts are densified with glass.

9 Claims, 2 Drawing Sheets

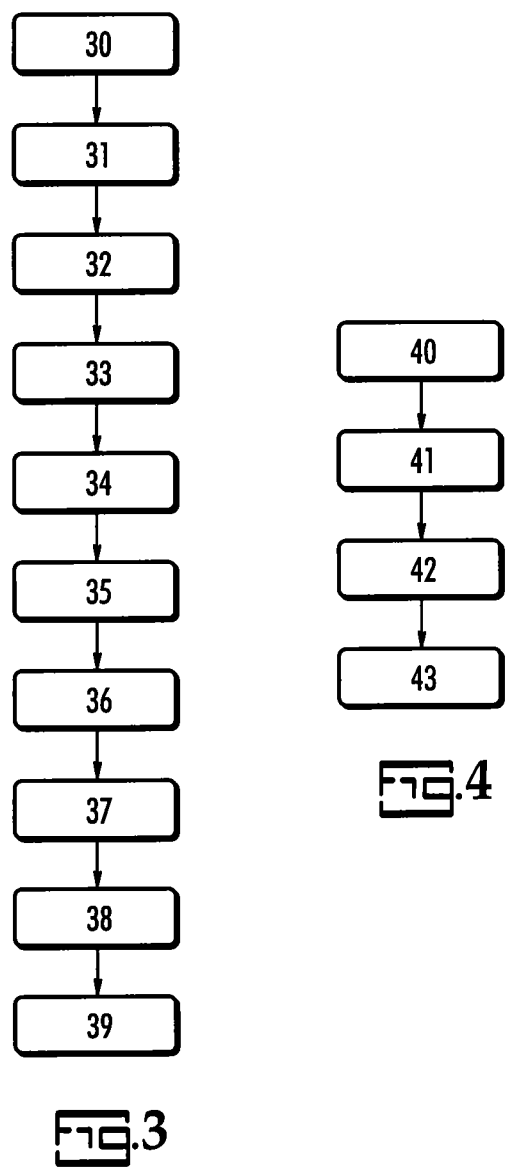

CORROSION RESISTANT GLASS COATING APPLIED TO CERAMIC FOAM USED TO FILTER MOLTEN ALUMINUM

CROSS-REFERENCE TO RELATED APPLICATIONS

The present application claims priority to U.S. Provisional Application No. 61/236,340 filed Aug. 24, 2009.

BACKGROUND

The present application is related to a ceramic foam filter for filtering molten metal. More specifically, the present invention is related to a ceramic foam filter comprising a partial glass coating.

Ceramic foam filters are widely used in the filtration of metals. The filters are typically formed by a sponge replication technique wherein polyurethane foam is coated with ceramic slurry, then dried and fired. During firing, the polyurethane foam on the inside vaporizes and the ceramic particles in the slurry bond to form a contiguous network of ceramic struts resulting in an exoskeleton-like foam structure that positively replicates the original polyurethane foam.

The struts at the surface of ceramic foam filters produced using the sponge replication technique tend to be inherently weak. Small filter fragments easily release from the surface with little stress applied. These filter fragments, if dislodged, can eventually reach the casting, which is highly undesirable. To enhance the strength of the ceramic foam surface, manufacturers typically spray the filter surfaces with additional ceramic slurry prior to firing. This technique has been shown to reduce the amount of particles released from a filter prior to use, which may result from packaging, shipping, handling, impact, etc.

Spraying filters with ceramic slurry is a problematic process. One must use relatively fine spray nozzles to sufficiently atomize the slurry to a fine mist to produce a smooth, continuous coating. Because the shear rate through a fine spray nozzle is high, it requires slurry with low viscosity and shear thinning behavior. This in turn requires the use of relatively fine powder, which tends to be expensive and demands high water content. If the spray slurry does not have sufficiently low viscosity, or shear thinning characteristics, the nozzle will clog.

Filters are typically sprayed with slurry after the first drying step, which tends to soften the face of the filter. Therefore, it must be handled very carefully to avoid damage to the surface. An additional drying step may be required before inserting the filter into the kiln.

Spraying the filter also reduces the size of pore windows at the surface and may completely close at least some portion of the porosity. This can cause problems when molten aluminum is first being primed through the filter, and can inhibit flow of aluminum after it has primed the filter. If the average window size of the pores is too fine, or the volume fraction of porosity at the surface is excessively closed, the filter may not prime or may only partially prime, and may restrict flow to an unacceptable level. Because spraying alters the pore structure of the surface, non-uniform application of the coating can induce significant variation in the pressure required to prime a filter, the success rate of fully priming a filter versus partial priming, and the flow rate of metal from filter to filter.

There has been an ongoing desire in the art for an improved ceramic foam filter that avoids the deficiencies of the art.

SUMMARY

It is an object of the invention to provide an improved ceramic foam filter that is particularly suitable for filtering molten aluminum.

A particular advantage of the invention is the robustness of the filter wherein fewer filter particles are entrained in the molten metal passing there through.

These and other advantages, as will be realized, are provided in a filter. The filter comprises a porous open celled ceramic foam body comprising voids separated by struts wherein a portion of said struts are densified with glass.

Yet another embodiment is provided in a method for forming a filter. The method comprises:
providing an open cell organic foam;
impregnating the open cell organic foam with a ceramic precursor;
applying a glass frit powder to a first surface of the impregnated open cell organic foam;
drying the impregnated open cell organic foam;
flipping the impregnated open cell organic foam;
spraying a second surface of the impregnated open cell organic foam with binder solution;
applying a glass frit powder to the second surface of the impregnated open cell organic foam;
heating the impregnated open cell ceramic foam with the glass frit powder applied to a temperature sufficient to melt the glass frit powder to form a glass coated foam precursor; and
heating the glass coated foam precursor to sinter the ceramic precursor.

Yet another embodiment is provided in a method for filtering molten metal. The method comprises:
providing a porous open celled ceramic foam body comprising voids separated by struts wherein a portion of the struts are densified with glass;
melting the metal;
passing the molten metal through the filter to form filtered molten metal;
collecting the filtered molten metal and
allowing the filtered molten metal to solidify.

BRIEF DESCRIPTION OF FIGURES

FIG. 3 is a flow chart representation of an embodiment of the invention.

FIG. 4 is a flow chart representation of an embodiment of the invention.

DESCRIPTION OF REPRESENTATIVE EMBODIMENTS

Figure 1:
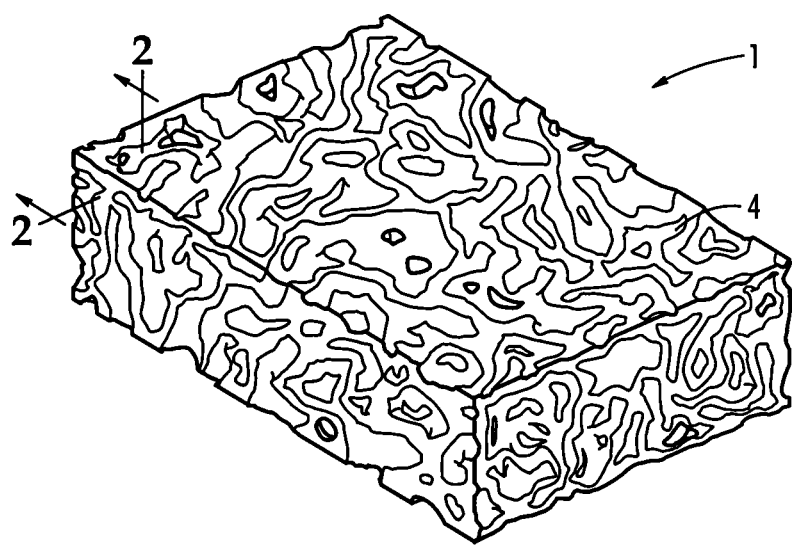
FIG. 1 is a perspective schematic view of an embodiment of the invention.

The invention is related to a method for applying a corrosion resistant partial glass coating to a ceramic foam filter and a ceramic foam filter provided thereby. While not limited thereto, the inventive ceramic foam filter is particularly well suited for filtering molten aluminum. The glass coating enhances the strength and robustness of the ceramic foam surface struts and mitigates the release of ceramic particles into the molten metal due to the inherently weak surface or from surface damage that often occurs prior to use.

The composition of the glass coating is preferably corrosion resistant to high magnesium-bearing aluminum alloys. The coating application process adds glass to the surface of the ceramic foam and densifies the structure by reducing the intergranular porosity within the strut without significant loss of surface porosity through which aluminum can flow. A strut with the porosity reduced is referred to herein as a densified strut. Surface porosity refers to a bulk property and is related to the percentage of voids in the structure through which aluminum can flow. Strut porosity is related to the density of the strut material itself and the voids formed therein.

The glass coating may be applied to a wet, freshly impregnated filter surface or dried filter surface using a dry glass-frit powder instead of a water-based slurry as is typically required in the art. The glass frit powder may be applied in a falling curtain using a vibratory feeder. The filter moves beneath the feeder and through the curtain while a prescribed deposition rate uniformly coats the surface.

On a dried filter, if the surface of the filter is made slightly sticky, such as with a light spray of polyvinyl alcohol binder solution or another liquid, the powder easily sticks to the surface of the dried filter and does not require an additional drying step.

The coating may be applied to one side of a wet filter just after impregnation using a glass-frit powder. The glass frit powder may be applied by curtain coating to other surfaces as described above. Because the filter is still very wet prior to drying, the glass frit readily adheres to the filter. The filter is then conventionally dried and the frit ends up being well-bonded to the surface of the filter.

When the glass frit is applied, the filter may look considerably blocked prior to firing. Upon firing, the glass powder melts and wicks into the intergranular porosity of the ceramic foam. The glass frit wets and conforms to the original structure of the impregnated ceramic foam. The window size and porosity are substantially maintained. The glass frit preferably has a sufficiently low melting point, and low viscosity after melting, to allow the surface of the ceramic foam to be wetted and wicked into its interstices. The glass frit is preferably corrosion resistant to magnesium bearing aluminum alloys.

The corrosion resistant glass frit is preferably a boron-aluminum-calcium oxide glass. A preferred glass frit has a composition of about 30-50 wt % boron oxide, about 30-36 wt % aluminum oxide about 20-28 wt % calcium oxide, and about 0-5 wt % other ingredients. A particularly preferred glass-frit is B-40C manufactured by Ferro having composition of about 40% boron oxide, about 33% aluminum oxide, about 24% calcium oxide, and about 3% other ingredients. A preferred particle size is −200 mesh.

Figure 2:
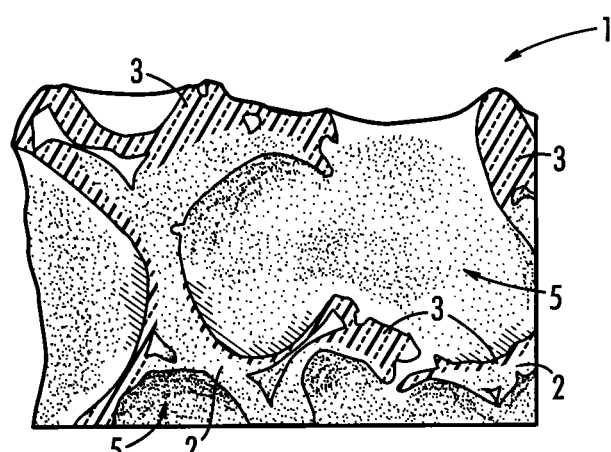
FIG. 2 is a partial view of the embodiment of FIG. 1.

An embodiment of the invention is illustrated schematically in FIGS. 1 and 2. In FIG. 1, an open cell ceramic foam filter, 1, is illustrated in perspective view. The ceramic foam filter comprises voids and struts as is more easily seen in FIG. 2, which is a partial view of the embodiment of FIG. 1. In FIG. 2, the struts, 2, extend throughout the filter forming a tortuous path of connected voids, 5, through which the molten metal traverses. The mechanism of particle entrapment is well understood and not further elaborated herein.

A portion of the struts, most preferably those portions which extend to the surface of the filter, are coated with glass, 3, thereby encasing a portion of the struts closest to the filter surface, 4. The glass generally deposits onto struts that are within line of sight when viewing the surface of the filter. During firing, the glass wicks into the ceramic and densifies the structure by reducing its porosity. The thickness of the glass coating on a given strut is typically at least 10 microns to no more than about 500 microns. Most preferably the thickness of the glass coatings is about 100-200 microns. The glass encasement preferably extends at least 50 μm into the filter, as measured perpendicular to a filter surface. The glass may penetrate two or three pore layers into the body of the filter and coat struts not on the surface. It is preferable that the amount of glass powder added to the surface not reach the point where it begins to block pores and form restrictions.

A comparison of the pressure drop on filters coated using the B-40C glass frit versus control samples showed no significant increase in pressure drop due to incorporation of the glass-frit coating.

A measurement of the priming head height on glass-frit coated filters using B-40C glass frit showed no significant additional pressure required to prime the filter versus the control.

Glass-coated filters subjected to corrosion testing in high magnesium bearing aluminum alloy showed no adverse corrosion reaction.

The ceramic foam filter is preferably made via the foam replication technique, which is a common method used to manufacture reticulated ceramic foam for use as a molten metal filtration device. In forming the filters, a foam, and most preferably polyurethane foam, is coated with ceramic slurry, then dried and fired. During firing, the foam within the ceramic coating vaporizes, but the ceramic structure remains resulting in an exoskeleton-like ceramic foam having hollow voids where the foam once resided. The structure is essentially a connection of struts with porosity residing around and within these struts. The process for forming a ceramic filter is provided in U.S. Pat. Nos. 4,056,586; 5,456,833 and 5,673,902, each of which are incorporated herein by reference.

The slurry employed depends on the desired ceramic material for the chosen application. One must have sufficient properties in the final product to withstand the particular application and must have sufficient structural and/or mechanical strength to stand up to the particular elevated temperature conditions. In addition, the slurry preferably has a relatively high degree of fluidity and most preferably comprises a liquid suspension of the ceramic intended for use in the filter. Normally, the slurry contains water. Additives, such as binders and surfactants, may be employed in the slurry to alter viscosity, wetting characteristics or rheology.

The flexible foam material is impregnated with the ceramic slurry so that the fiber-like webs are coated therewith and the voids are filled therewith. The pore size is preferably between 2 and 70-ppi. Normally, it is preferred to repeatedly immerse the foam in the slurry and compress the foam between immersions to insure complete impregnation of the foam.

The impregnated foam is preferably compressed to expel from 25 to 75% of the slurry while leaving the fiber-like web portion coated. In a continuous operation, one may pass the impregnated foam through a preset roller to affect the desired expulsion of slurry from the foam and leave the desired amount impregnated therein. This may be done manually by simply squeezing the flexible foam material to the desired extent. At this stage, the foam is still flexible and may be formed into configurations suitable for the specific filtration task, i.e., into curved plates, hollow cylinders, etc. It is necessary to hold the formed foam in position by conventional means until the polymeric substrate is decomposed, or preferably until the ceramic is sintered. The impregnated foam is then dried by either air drying or accelerated drying at a temperature of from 35° to 700° C. for from 2 minutes to 6 hours. After drying, the material is heated at an elevated temperature to bond the ceramic particles making up the fiber-like webs. It is preferred to heat the dried impregnated material in two stages, with the first stage being to heat to a temperature of from 350° to 700° C. and holding within this temperature range for from 2 minutes to 6 hours in order to burn off or volatilize the web of flexible foam. Clearly this step can be part of the drying cycle, if desired. The second stage is to heat to a temperature of from 900° to 1700° C. and hold within that temperature range for from 2 minutes to 10 hours in order to bond the ceramic. The resulting product is a fused ceramic foam having an open cell structure characterized by a plurality of interconnected voids surrounded by a web of the ceramic. The ceramic foam may have any desired configuration based on the configuration needed for the particular molten metal filtration process.

The process for forming the filter comprises forming a slurry of ceramic precursors. For the purposes of the present invention, ceramic precursors may comprise aluminosilicate powder, colloidal silica, ceramic oxide powders such as alumina and glass frit, dispersant and organic thickening agent. The slurry may comprise a surfactant to decrease the surface tension for improved wetting characteristics.

A method of forming a ceramic foam filter is illustrated in a flow chart in FIG. 3. In FIG. 3, a reticulated open cell polyurethane foam is provided at 30. The foam is impregnated with a ceramic precursor slurry at 31 to form an impregnated foam. At 32, glass frit is applied to the top surface of the wet filter. The impregnated foam is then dried at 33. It is preferable to cut the filter to size after drying and prior to further treatment. At 34, the filter is flipped so that glass frit can be applied to the other surface. A sticky binder solution, such as polyvinyl alcohol, is applied at 35. The glass frit powder is applied to the surface at 36. At 36, both surfaces are coated with glass frit, thereby creating a surface coated filter precursor. The filter precursor is optionally heated at 37 to remove any solvent and volatile material. Heating continues at 38 to melt the glass frit powder thereby allowing the glass to wick into the filter body and coat the interstitial struts. Further heating occurs at 39 to sinter the ceramic precursor thereby forming a ceramic. The heating steps may be sequential with cool-down between sequences or the heating may contain a heating profile with various temperature increases and hold times at a predetermined temperature.

The term "refractory aluminosilicate" as used herein refers to refractory raw materials that comprise predominantly mullite and kyanite, which possess a pyrometric cone equivalent (PCE) of at least 20. This class of raw materials is also known in the refractory materials literature by the synonyms calcined fireclay, calcined aggregate, refractory calcines, mullite calcines, refractory aggregates, calcined kyanite, electrofused mullite and chamottes.

In one embodiment the ceramic precursor preferably comprises 40-60% inexpensive ceramic grain material such as aluminosilicate, examples of which are mullite or kyanite, 0-20% inorganic binder that fluxes at low temperature and binds the ceramic grain material, examples include fine clay or colloidal silica, 0-20% fine ceramic material, wherein a fine material refers to a material with a particle size of less than about 10 microns, to aid in flow properties of the ceramic slurry, examples include silica fume, finely ground mullite, or finely ground kyanite, 0-20% water to achieve the desired slurry rheological flow characteristics, and 0-1% dispersing aids such as ammonium polyacrylate.

The density of the resulting filter is preferably at least about 7 wt % of theoretical density to no more than about 18 wt % of theoretical density. Above about 18 wt % of theoretical density, the filtering rate is too slow to be effective. Below about 7 wt % of theoretical density, the strength of the filter is insufficient for use in filtering molten aluminum. Theoretical density is a common term of art wherein density is reported as a percentage of the theoretical density of the ceramic material assuming no voids.

Refractory aluminosilicate is a naturally occurring material with a nominal composition of $3Al_2O_3.2SiO_2$. In practice, refractory aluminosilicate comprises from about 45 wt % to 70 wt % $Al_2O_3$ and about 25 wt % to about 50 wt % $SiO_2$. Naturally occurring impurities are present and one of skill in the art would realize that completely removing the impurities is cost prohibitive. In practice, refractory aluminosilicate has about 1.5-3 wt % $TiO_2$, up to about 1.5 wt % $Fe_2O_3$, up to about 0.06 wt % CaO, up to about 0.8 wt % MgO, up to about 0.09 wt % $Na_2O$, up to about 0.9 wt % $K_2O$ and up to about 0.12 wt % $P_2O_5$. For the purposes of the present invention, the preferred refractory aluminosilicate is Virginia Kyanite −325 mesh available from Kyanite Mining Company in Dillwyn, Va., but any commercially available refractory aluminosilicate powder is suitable for demonstration of the invention.

It is preferable to add volatile organic materials into the ceramic slurry to further increase the porosity.

In one embodiment, a ceramic precursor comprising spherically shaped voids therein can be formed into the desired shape of the porous ceramic and fired as described in U.S. Pat. No. 6,773,825, which is incorporated herein by reference thereto.

A mixture of ceramic or metal particles and pliable organic spheres as the pore former is prepared into a liquid, or suspension, and the mixture is formed into a shaped article. The shaped article is dried and fired so that the particles are bonded by sintering. The organic spheres and other organic additives are volatilized. The spheres are preferably low density and more preferably hollow. The size of the voids may be preselected by selecting the appropriate polymer spheres. The porosity is also easily controlled by the number of polymer spheres added. It is most preferred that the polymer spheres are each in contact with at least two other spheres such that a network of voids is created in the eventual diffuser.

To a suspension of ceramic precursor is added pliable organic hollow spheres, which are simultaneously suspended in the solvent as a pore former. The ceramic precursor is then incorporated into the foam as described further herein and dried to remove the solvent. When the ceramic precursor is fired to form a ceramic, the spheres are volatilized resulting in uniformly distributed voids throughout the filter lattice. Using this method a range of porosities can be achieved, however, for use in molten aluminum filtration it is preferable that the porosity be no more than 60% due to insufficient thermal stress resistance at higher levels of porosity. The porosity and pore size is easily controlled by the number and sizes of polymer spheres used. After firing, the void is substantially the same shape and size as the included sphere. It is most preferable to utilize spheres with an average diameter of 20 to 150 microns and more preferably 20-80 microns. An 80 micron sphere is most preferred. Other organic pore formers may be utilized, including flour, cellulose, starch and the like. Hollow organic spheres are most preferred due to the low volume of organic to pore volume that can be achieved and the minimal level of organic residue remaining after firing. It is most preferred that the slurry comprise up to about 10 wt % pore formers based on an 80 micron hollow sphere.

The material is either formed to size or cut to size. The material can be cut to size as a green ceramic or as a sintered ceramic.

A method of using the filters is illustrated in schematic view in FIG. 4. In FIG. 4, a molten metal, preferably aluminum, is melted at 40. The molten metal is then passed through the filter with glass coated struts near the surface at 41 wherein impurities in the metal are removed by filtration. The filtered molten metal is collected at 42, preferably in a mold, and allowed to cool. The solidified metal is then removed from the collection location at 43.

The present invention has been described with particular reference to the preferred embodiments, which are intended to be illustrative, but are not considered to be limiting. Other configurations, alterations and embodiments could be realized from the teachings herein without departing from the scope of the invention, which is set forth more clearly in the claims appended hereto.

The invention claimed is:

1. A filter comprising:
   a porous open celled ceramic foam body with a porosity of 2-70 ppi comprising voids separated by struts wherein portions of said struts are coated with glass conforming to a structure of said struts and wherein said portions of said struts are densified with glass over a distance of at least 50 µm into the ceramic as measured perpendicular to a surface.

2. The filter of claim 1 wherein said glass is at least 100 to no more than 500 µm into said ceramic.

3. The filter of claim 2 wherein said glass is at least 100 to no more than 200 µm into said ceramic.

4. The filter of claim 1 wherein said glass is a boron-aluminum-calcium oxide glass.

5. The filter of claim 4 wherein said boronaluminum-calcium oxide glass comprises 30-50 wt % boron oxide, 30-36 wt % aluminum oxide; 20-28 wt % calcium oxide, and 0-5% other oxides.

6. The filter of claim 5 wherein said boron-aluminum-calcium oxide glass comprises 40% boron oxide, 33% aluminum oxide and 24% calcium oxide, and 3% other oxides.

7. The filter of claim 1 wherein said ceramic comprises aluminosilicate.

8. The filter of claim 7 wherein said aluminosilicate is kyanite or mullite.

9. The filter of claim 1 wherein said filter has a density of 7-18% of a theoretical density.

* * * * *